United States Patent
Hakiri et al.

(10) Patent No.: US 8,529,048 B2
(45) Date of Patent: Sep. 10, 2013

(54) INKJET INK, INK CARTRIDGE, IMAGE FORMING DEVICE, IMAGE FORMING METHOD, AND IMAGE FORMED MATTER

(75) Inventors: Minoru Hakiri, Shizuoka (JP); Mitsuru Naruse, Shizuoka (JP); Hiroyuki Fushimi, Shizuoka (JP); Shin Hasegawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 138 days.

(21) Appl. No.: 13/143,148

(22) PCT Filed: Dec. 8, 2009

(86) PCT No.: PCT/JP2009/070796
§ 371 (c)(1),
(2), (4) Date: Jul. 1, 2011

(87) PCT Pub. No.: WO2010/079670
PCT Pub. Date: Jul. 15, 2010

(65) Prior Publication Data
US 2011/0267398 A1  Nov. 3, 2011

(30) Foreign Application Priority Data
Jan. 9, 2009 (JP) .................. 2009-003854

(51) Int. Cl.
*C09D 11/00* (2006.01)

(52) U.S. Cl.
USPC ........................................... 347/100

(58) Field of Classification Search
CPC ............... C09D 11/00; C09D 11/02
USPC ............ 347/20, 86, 100, 105; 106/31.13
See application file for complete search history.

(56) References Cited

U.S. PATENT DOCUMENTS

| | | |
|---|---|---|
| 6,031,019 A | 2/2000 | Tsutsumi et al. |
| 6,786,959 B2 | 9/2004 | Hakiri et al. |
| 7,101,919 B2 | 9/2006 | Hasegawa et al. |
| 7,427,640 B1 * | 9/2008 | Katayama et al. ............ 514/785 |
| 7,798,629 B2 | 9/2010 | Hakiri et al. |
| 7,815,301 B2 | 10/2010 | Hasegawa et al. |
| 7,828,887 B2 * | 11/2010 | Rengaswamy et al. .... 106/31.58 |
| 2005/0284332 A1 | 12/2005 | Shinjo et al. |
| 2006/0272543 A1 | 12/2006 | Hakiri et al. |
| 2007/0221078 A1 | 9/2007 | Namba et al. |
| 2008/0036830 A1 | 2/2008 | Natori et al. |
| 2008/0152811 A1 | 6/2008 | Koike et al. |
| 2008/0257207 A1 | 10/2008 | Rengaswamy et al. |

FOREIGN PATENT DOCUMENTS

| | | |
|---|---|---|
| JP | 10 338829 | 12/1998 |
| JP | 2000 44852 | 2/2000 |
| JP | 2004 299386 | 10/2004 |
| JP | 2005 298609 | 10/2005 |
| JP | 2005 298806 | 10/2005 |
| JP | 2006 077232 | 3/2006 |
| JP | 2006 104244 | 4/2006 |
| JP | 2006 152133 | 6/2006 |
| JP | 2007 146167 | 6/2007 |
| JP | 2007 197483 | 8/2007 |
| JP | 2007 217472 | 8/2007 |
| JP | 2007 277362 | 10/2007 |
| JP | 2008 184567 | 8/2008 |
| JP | 2008 231132 | 10/2008 |
| WO | 2008 131396 | 10/2008 |

OTHER PUBLICATIONS

International Search Report issued Feb. 2, 2010 in PCT/JP09/070796 filed Dec. 8, 2009.

* cited by examiner

*Primary Examiner* — An Do
(74) *Attorney, Agent, or Firm* — Oblon, Spivak, McClelland, Maier & Neustadt, L.L.P.

(57) ABSTRACT

To provide an inkjet ink containing C4-6 diol; and trimethylglycine.

20 Claims, 2 Drawing Sheets

INKJET INK, INK CARTRIDGE, IMAGE FORMING DEVICE, IMAGE FORMING METHOD, AND IMAGE FORMED MATTER

This application is a 371 of PCT/JP2009/070796, filed Dec. 8, 2009. Priority to Japanese patent application 2009-003854, filed Jan. 9, 2009, is claimed.

TECHNICAL FIELD

The present invention relates to an inkjet ink excellent in the ink storage stability.

BACKGROUND ART

An inkjet recording method has been widely used because of advantages such that full-color recording is easily achieved as the process thereof is simple compared to other recording method, and images of high resolution can be attained even with a device of a simple structure.

As an inkjet ink, a dye ink and a pigment ink are available. In the case of an aqueous pigment ink, a surfactant or water-soluble resin is generally used for dispersing a hydrophobic pigment. Moreover, there have been known the technique such that film-forming resin particles are added for improving an image quality, and the technique (Patent Literature 1) such that a wetting agent (e.g. glycerin and polyhydric alcohol) is added for improving jetting stability. However, it is difficult to stably and finely disperse numbers of substances, and the degradation of the stability of ink due to the long-period of storage is especially problematic.

Moreover, Patent Literature 2 discloses an ink containing a compound which contains trimethylglycine and is represented by the general formula (I), and at least one water-soluble compound selected from the group consisting of the (nitrogen-containing) compound represented by the general formula (II), polyalkylene glycol, polyglycerin, and bishydroxyethylsulfone, and lists 1,5-pentane diol, 1,6-hexane diol, and the like as a water-soluble compound usable in combination. However, the combination of trimethylglycine and C4-6 diol, and the usability thereof are not mentioned therein.

CITATION LIST

Patent Literature

[PTL 1] Japanese Patent Application Laid-Open (JP-A) No. 2006-077232
[PTL 2] JP-A No. 2007-277362.

SUMMARY OF INVENTION

Technical Problem

The present invention aims at providing an inkjet ink excellent in the ink storage stability, and an ink cartridge, image forming device, image forming method, and image formed matter using such the inkjet ink.

Solution to Problem

The means for solving the problem is as follows:
<1> An inkjet ink containing: C4-6 diol; and trimethylglycine.
<2> The inkjet ink according to <1>, wherein the C4-6 diol is at least one selected from the group consisting of 1,6-hexane diol, 1,5-pentane diol, 1,3-butane diol, and 3-methyl-1,3-butane diol.
<3> An ink cartridge containing: a container; and the inkjet ink as defined in any of <1> or <2>, which is housed in the container.
<4> An image forming device containing: the ink cartridge as defined in <3>.
<5> An image forming method containing: forming an image by means of an inkjet recording device using the inkjet ink as defined in any of <1> or <2>.
<6> An image formed matter, containing: a recording medium; and an image formed on the recording medium by means of an inkjet recording device using the inkjet ink as defined in any of <1> or <2>.

Advantageous Effects of Invention

According to the present invention, there can be provided an inkjet ink excellent in the ink storage stability, and an ink cartridge, image forming device, image forming method, and image formed matter using such the inkjet ink.

DESCRIPTION OF EMBODIMENTS

Figure 1:
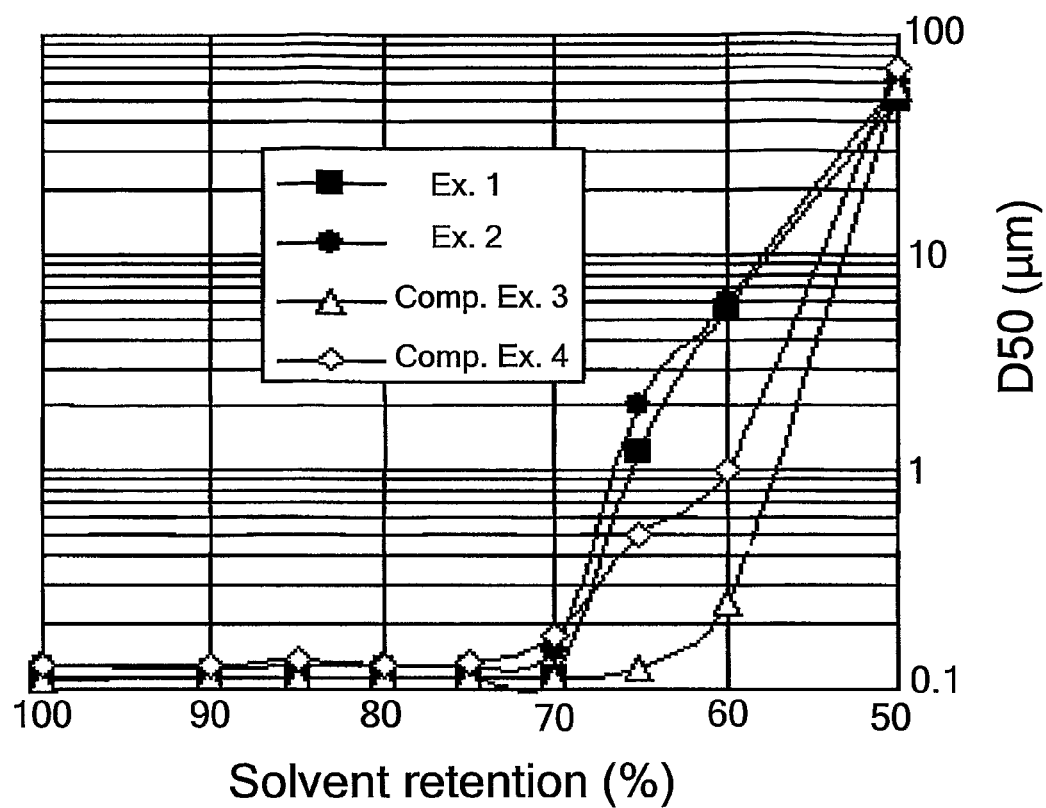
FIG. 1 is a diagram showing a relationship between the retention of the solvent and D50.

The present invention will be specifically explained hereinafter.

The inkjet ink of the present invention contains C4-6 diol and trimethylglycine. These compounds function mainly as a wetting agent. The wetting agent preferably has an equilibrium moisture content of 25% by mass or more, preferably 30% by mass or more, more preferably 35% by mass or more at the temperature of 20° C. and the relative humidity of 60%. Examples of the diol satisfying such the conditions include 1,6-hexane diol, 1,5-pentane diol, 2-methyl-2,4-pentane diol, 1,3-butane diol, 1,4-butane diol, 2,3-butane diol, and 3-methyl-1,3-butane diol. Among them, 1,6-hexane diol, 1,5-pentane diol, 1,3-butane diol, and 3-methyl-1,3-butane diol are particularly preferable. These tend to easily form hydrogen bonding, independently have high viscosity and high equilibrium moisture content, and lower the viscosity in the presence of moisture, and hence are preferable for the present invention. Moreover, 1,3-butane diol exhibits a high effect for making the spreads of picture elements uniform at the time when the ink is deposited onto paper, and retaining a colorant onto a surface of the paper.

The proportion of the wetting agent in the inkjet ink is preferably 10% by mass to 50% by mass, more preferably 25% by mass to 35% by mass. The proportion thereof is preferably 10% by mass or more for attaining the storage stability and jetting stability of the inkjet ink to thereby reduce a clogging of a nozzle. The proportion thereof is preferably 50% by mass or less for maintaining drying property and reducing occurrences of bleeding of characters, or bleeding at a boundary between different colors to thereby maintain its image quality.

The amount of trimethylglycine contained in the inkjet ink is preferably 10% by mass to 40% by mass with respect to the total amount of the wetting agent for attaining both the storage and jetting stability of the inkjet ink and the desirable image density.

For the inkjet ink of the present invention, a pigment is used as a colorant in view of weather resistance thereof, but a dye may be further added therein for controlling the color tone thereof in such an amount that does not degrade the weather resistance of the inkjet ink.

The amount of the colorant contained in the inkjet ink is preferably about 0.5% by mass to about 15% by mass, more preferably about 5% by mass to about 12% by mass.

The cumulative average particle diameter D50 (50% particle diameter of accumulation) of the pigment particles is preferably 20 nm to 150 nm, more preferably 50 nm to 130 nm. D50 is preferably 20 nm or more for maintaining the image density, and is preferably 150 nm or less for attaining the jetting stability.

Moreover, the standard deviation of the particle diameters in the particle diameter distribution of the pigment particles is preferably smaller than the cumulative average particle diameter D50 thereof. When the standard deviation of the particle diameters is larger than D50, the jetting stability may be degraded, or blurring and the like of an print image tends to be formed.

In addition, with regard to the retention of the solvent expressed by the following formula, when D50 is more than 5 μm at the solvent retention of 60% at the time when the ink is dried, or when D90 (90% particle diameter of accumulation) is more than 10 μm, the image density is increased and thus it is preferable.

Solvent retention(%)=[(Initial amount of the solvent−Amount of the evaporated solvent)/Initial amount of the solvent]×100

The pigment having the aforementioned property can be attained by using self-dispersible pigment particles, which are dispersible in water without the assistance of a dispersing agent, and are processed so as to have at least one hydrophilic group directly or via other atom group bonded to a surface of each pigment particle, or using polymer emulsion containing polymer particles each of which include a water insoluble pigment or a pigment having a poor solubility to water.

The self-dispersible pigment particles can be obtained by chemically bonding a certain functional group (e.g. a functional group such as a sulfone group and a carboxyl group) to a surface of each pigment particles, or subjecting pigment particles to a wet oxidation processing using hypohalous acid and/or a salt thereof. The preferable embodiment of the self-dispersible pigment particles are the pigment particles having a carboxyl group bonded to each surface thereof, and being dispersed in water. The use of such the self-dispersible pigment particles improves dispersion stability, and provides high printing quality, as well as improving water resistance of a recording medium after printing.

Moreover, the ink using such the pigment has excellent re-dispersibility after drying, and thus the ink does not cause the clogging of a nozzle of an inkjet head even when a printing device or the like is rested from printing for a long time and the moisture of the ink adjacent to the nozzle is evaporated. Therefore, excellent printing can be carried out easily after performing a simple cleaning operation. Furthermore, this self-dispersible pigment has a high synergistic effect particularly when it is used in combination with a surfactant and a penetrating agent described below, and with the combination, can provide images of high reliability and high quality.

Examples of the polymer emulsion containing the pigment include one in which a pigment is encapsulated in a polymer particle, or one in which a pigment is adsorbed onto a surface of a polymer particle. However, all of the pigment particles are not necessarily encapsulated or adsorbed, and some of the pigment particles may be dispersed in the emulsion provided that it does not adversely affect the obtainable effect of the present invention.

Examples of the polymer forming the polymer emulsion include vinyl polymer, polyester polymer, and polyurethane polymer. Among them, the vinyl polymer and the polyester polymer are particularly preferable, and are disclosed, for example, in JP-A Nos. 2000-53897 and 2001-139849.

Examples of the inorganic pigment for use in the present invention include titanium oxide, iron oxide, calcium carbonate, barium sulfate, aluminum hydroxide, barium yellow, cadmium red, chrome yellow, and carbon black which is produced by the methods known in the art, such as a contact method, Farness method, and thermal method.

Examples of the organic pigment for use in the present invention include: an azo pigment such as azo lake, insoluble azo pigment, condensation azo pigment, and chelate azo pigment; a heterocyclic pigment, such as phthalocyanine pigment, perylene pigment, perinone pigment, anthraquinone pigment, quinacridon pigment, dioxazine pigment, indigo pigment, thioindigo pigment, iso-indolinone pigment, and quinoflarone pigment; dye chelate such as basic dye chelate and acidic dye chelate; nitro pigment; nitroso pigment; and aniline black. Among them, those having excellent affinity with water are particularly preferable.

Specific examples of the black pigment among the aforementioned pigments include: carbon black (C.I. PIGMENT BLACK 7) such as farness black, lamp black, acetylene black, and channel black; metals such as copper, iron (C.I. PIGMENT BLACK 11), and titanium oxide; and an organic pigment such as aniline black (C.I. PIGMENT BLACK 1).

Specific examples of the color pigment include: C.I. PIGMENT YELLOW 1, 3, 12, 13, 14, 17, 24, 34, 35, 37, 42 (yellow oxide), 53, 55, 74, 81, 83, 95, 97, 98, 100, 101, 104, 108, 109, 110, 117, 120, 128, 138, 150, 151, 153, 183; C.I. PIGMENT ORANGE 5, 13, 16, 17, 36, 43, 51; C.I. PIGMENT RED 1, 2, 3, 5, 17, 22, 23, 31, 38, 48:2 [permanent red 2B(Ca)], 48:3, 48:4, 49:1, 52:2, 53:1, 57:1 (brilliant carmine 6B), 60:1, 63:1, 63:2, 64:1, 81, 83, 88, 101 (red iron oxide), 104, 105, 106, 108 (cadmium red), 112, 114, 122 (quinacridon magenta), 123, 146, 149, 166, 168, 170, 172, 177, 178, 179, 185, 190, 193, 209, 219; C.I. PIGMENT VIOLET 1(rhodamine lake), 3, 5:1, 16, 19, 23, 38; C.I. PIGMENT BLUE 1, 2, 15, 15:1, 15:2, 15:3 (Phthalocyanine blue), 16, 17:1, 56, 60, 63; and C.I. PIGMENT GREEN 1, 4, 7, 8, 10, 17, 18, 36.

Other than the ones mentioned above, the color pigments described in The Colour Index, the 3rd edition (The Society of Dyers and Colourists, 1982) can also be used.

The dyes usable in combination with the pigment are, for example, as follows, and an acid dye and a direct dye are particularly preferable.

<Acid Dye, Food Dye>
C.I. ACID YELLOW 17, 23, 42, 44, 79, 142;
C.I. ACID RED 1, 8, 13, 14, 18, 26, 27, 35, 37, 42, 52, 82, 87, 89, 92, 97, 106, 111, 114, 115, 134, 186, 249, 254, 289;
C.I. ACID BLUE 9, 29, 45, 92, 249;
C.I. ACID BLACK 1, 2, 7, 24, 26, 94;
C.I. FOOD YELLOW 2, 3, 4;
C.I. FOOD RED 7, 9, 14; and
C.I. FOOD BLACK 1, 2.
<Direct Dye>
C.I. DIRECT YELLOW 1, 12, 24, 26, 33, 44, 50, 120, 132, 142, 144, 86;

C.I. DIRECT RED 1, 4, 9, 13, 17, 20, 28, 31, 39, 80, 81, 83, 89, 225, 227;
C.I. DIRECT ORANGE 26, 29, 62, 102;
C.I. DIRECT BLUE 1, 2, 6, 15, 22, 25, 71, 76, 79, 86, 87, 90, 98, 163, 165, 199, 202
C.I. DIRECT BLACK 19, 22, 32, 38, 51, 56, 71, 74, 75, 77, 154, 168, 171
<Basic Dye>
C.I. BASIC YELLOW 1, 2, 11, 13, 14, 15, 19, 21, 23, 24, 25, 28, 29, 32, 36, 40, 41, 45, 49, 51, 53, 63, 64, 65, 67, 70, 73, 77, 87, 91;
C.I. BASIC RED 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112;
C.I. BASIC BLUE 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and
C.I. BASIC BLACK 2, 8.
<Reactive Dye>
C.I. REACTIVE BLACK 3, 4, 7, 11, 12, 17;
C.I. REACTIVE YELLOW 1, 5, 11, 13, 14, 20, 21, 22, 25, 40, 47, 51, 55, 65, 67;
C.I. REACTIVE RED 1, 14, 17, 25, 26, 32, 37, 44, 46, 55, 60, 66, 74, 79, 96, 97; and
C.I. REACTIVE BLUE 1, 2, 7, 14, 15, 23, 32, 35, 38, 41, 63, 80, 95.

A surfactant for use in the present invention may be nonionic or ionic, but a fluorosurfactant is preferable. Among them the one expressed by the following structural formula 1 is preferable.

Structural Formula 1

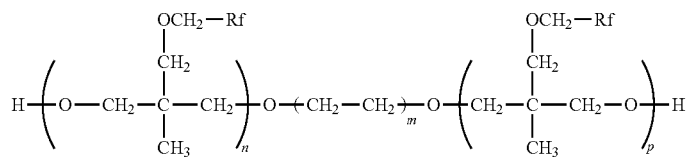

In the structural formula 1, Rf denotes a fluorine-containing hydrocarbon group; and m, n, and p each denote an integer.

The amount of the surfactant contained in the ink is preferably 0.01% by mass to 5.0% by mass, more preferably 0.5% by mass to 3% by mass, yet more preferably 0.8% by mass to 2.0% by mass. With the amount of 0.01% by mass or more, the effect of the surfactant can be surely attained. In addition, when the amount thereof is 5.0% by mass or less, the problem such that the permeability of the ink to a recording medium becomes excessively high to thereby cause lowering of an image density or strike-through may not occur.

The penetrating agent for use of the present invention includes: for example, alcohol such as methanol, ethanol, 1-propanol, 2-propanol, and 2-ethyl-1,3-hexane diol a pyrrolidone derivative such as N-methylpyrrolidone, and 2-pyrrolidone; and sodium polyoxyethylene-3-tridecylether acetate.

The amount of the penetrating agent contained in the ink is preferably 0.1% by mass to 5% by mass, more preferably 0.3% by mass to 4% by mass, yet more preferably 0.5% by mass to 3% by mass.

The inkjet ink of the present invention is suitably used in the form of an inkjet cartridge that contains the inkjet ink therein. Moreover, the inkjet ink of the present invention is applicable for an image forming device such as an inkjet recording device, and an image forming method and an image formed matter using such the device.

Examples of the printing method by means of the inkjet recording device include a continuous jetting method and an on-demand method. Examples of the on-demand method include a piezo method, a thermal method, and an electrostatic method.

EXAMPLES

The present invention will be concretely explained hereinafter with examples and comparative Examples thereof. However, these examples shall not be construed as to limit the scope of the present invention.

Preparation Example 1

Preparation of a Dispersion Liquid Containing Surface-Treated Carbon Black

To 3,000 mL of 2.5N sodium sulfate solution, 90 g of carbon black having the BET specific area of 220 m$^2$/g, and DBP adsorption of 100 mL/100 g was added, and the mixture was stirred at 60° C. at 300 rpm and allowed to react for 10 hours, to thereby perform an oxidation treatment.

Then, the reaction solution was filtered, and the filtered carbon black was neutralized with sodium hydroxide solution, to thereby perform an ultrafilteration.

The obtained carbon black was washed with water and then dried, followed by dispersing the carbon black in pure water so that the amount of the carbon black was to be 20% by mass, to thereby obtain a dispersion liquid of a carbon black pigment.

Synthesis Example 1

Preparation of a Polymer Dispersion Liquid

An inner atmosphere of 1 L flask equipped with a mechanical stirrer, a thermometer, a nitrogen gas inlet tube, a reflux tube, and a dropping funnel was sufficiently replaced with a nitrogen gas, then charged with 11.2 g of styrene, 2.8 g of acrylic acid, 12.0 g of lauryl methacrylate, 4.0 g of polyethyleneglycol methacrylate, 4.0 g of styrene macromer (AS-6, manufactured by TOAGOSEI CO., LTD.), and 0.4 g of mercapto ethanol, and the mixture was heated at 65° C.

Then, a mixed solution of 100.8 g of styrene, 25.2 g of acrylic acid, 108.0 g of lauryl methacrylate, 36.0 g of polyethyleneglycol methacrylate, 60.0 g of hydroxyethyl methacrylate, 36.0 g of styrene macromer (AS-6, manufactured by TOAGOSEI CO., LTD.), 3.6 g of mercapto ethanol, 2.4 g of azobisdimethylvaleronitrile, and 18 g of methylethylketone was dropped into the flask over 2.5 hours.

After the completion of dropping, a mixed solution of 0.8 g of azobisdimethylvaleronitrile, and 18 g of methylethylketone was dropped into the flask over 0.5 hours. After maturing the mixture at 65° C. for 1 hour, 0.8 g of azobisdimethylvaleronitrile was added thereto and then the mixture was further matured for 1 hour.

After the completion of the reaction, 364 g of methylethylketone was added to the flask to thereby obtain 800 g of a polymer solution having a concentration of 50%.

Preparation Example 2

Preparation of a Dispersion Liquid of Carbon Black Pigment-Containing Polymer Particles After sufficiently mixing and stirring 28 g of the polymer solution prepared in Synthesis Example 1, 26 g of carbon black, 13.6 g of 1 mol/L potassium hydroxide solution, 20 g methylethylketone, 30 g of ion-exchanged water, the mixture was kneaded by means of a three-roll mill.

To the paste, 200 g of ion-exchanged water was added, and sufficiently stirred, followed by evaporating methylethylketone and water by means of an evaporator, to thereby obtain a dispersion liquid of black polymer particles each containing a carbon black pigment.

Preparation Example 3

Preparation of a Carbon Black Pigment Dispersion Liquid

C.I. CARBON BLACK (150 g) and 2 g of polyvinyl pyrrolidone (average molecular weight of 25,000) serving as a dispersing agent, and 738 g of distilled water were mixed, and the mixture was subjected to pre-dispersing, followed by circulating and dispersing by means of a disc beads mill (KDL, manufactured by SHINMARU ENTERPRISES CORPORATION, media: zirconium ball having a diameter of 0.3 mm) for 20 hours, to thereby obtain a carbon black pigment dispersion liquid.

Preparation Example 4

Preparation of a Carbon Black Pigment Dispersion Liquid

A carbon black pigment dispersion liquid of Preparation Example 4 was obtained in the same manner as in Preparation Example 3, provided that the dispersing agent used in Preparation Example 3 was replaced with PLYSURF A219B (polyoxyethylene alkylether phosphate, manufactured by DAI-ICHI KOGYO SEIYAKU CO., LTD.).

Preparation Example 5

Preparation of a Carbon Black Pigment Dispersion Liquid

A carbon black dispersion liquid of Preparation Example 5 was obtained in the same manner as in Preparation Example 3, provided that the dispersing agent used in Preparation Example 3 was replaced with HITENOL 18E (an anionic surfactant, manufactured by DAI-ICHI KOGYO SEIYAKU CO., LTD.).

Example 1

The materials of the following formula were mixed, and then adjusted with 10% lithium hydroxide so as to have a pH value of 9, followed by being filtered through a membrane filter having an average pore diameter of 0.8 μm, to thereby obtain an ink composition.

| | |
|---|---|
| Carbon black pigment dispersion liquid of Preparation Example 1 (solid content) | 8.0% by mass |
| 1,6-hexanediol | 27.5% by mass |
| trimethylglycine | 8.5% by mass |
| Surfactant expressed by the structural formula 1 (PF-151N, manufactured by OMNOVA SOLUTIONS INC.) | 0.5% by mass |
| 2-ethyl-1,3-hexanediol | 2.0% by mass |
| Ion-exchanged water | 53.5% by mass |

Example 2

The materials of the following formula were mixed, and then adjusted with 10% lithium hydroxide so as to have a pH value of 9, followed by being filtered through a membrane filter having an average pore diameter of 0.8 μm, to thereby obtain an ink composition.

| | |
|---|---|
| Carbon black pigment-containing polymer particle dispersion liquid of Preparation Example 2 (solid content) | 10.0% by mass |
| 1,6-hexanediol | 27.5% by mass |
| trimethylglycine | 8.0% by mass |
| Surfactant expressed by the structural formula 1 (PF-151N, manufactured by OMNOVA SOLUTIONS INC.) | 0.5% by mass |
| 2-ethyl-1,3-hexanediol | 2.0% by mass |
| Ion-exchanged water | 52.0% by mass |

Example 3

The materials of the following formula were mixed, and then adjusted with 10% lithium hydroxide so as to have a pH value of 9, followed by being filtered through a membrane filter having an average pore diameter of 0.8 μm, to thereby obtain an ink composition.

| | |
|---|---|
| Carbon black pigment dispersion liquid of Preparation Example 1 (solid content) | 8.0% by mass |
| 1,5-pentanediol | 23.3% by mass |
| trimethylglycine | 10.7% by mass |
| Surfactant expressed by the structural formula 1(PF-151N, manufactured by OMNOVA SOLUTIONS INC.) | 0.5% by mass |
| 2-ethyl-1,3-hexanediol | 2.0% by mass |
| Ion-exchanged water | 55.5% by mass |

Example 4

The materials of the following formula were mixed, and then adjusted with 10% lithium hydroxide so as to have a pH value of 9, followed by being filtered through a membrane filter having an average pore diameter of 0.8 μm, to thereby obtain an ink composition.

| | |
|---|---|
| Carbon black pigment-containing polymer particle dispersion liquid of Preparation Example 2 (solid content) | 10.0% by mass |
| 1,5-pentane diol | 23.3% by mass |

-continued

| | |
|---|---|
| trimethylglycine | 10.7% by mass |
| Surfactant expressed by the structural formula 1(PF-151N, manufactured by OMNOVA SOLUTIONS INC.) | 0.5% by mass |
| 2-ethyl-1,3-hexanediol | 2.0% by mass |
| Ion-exchanged water | 53.5% by mass |

Example 5

The materials of the following formula were mixed, and then adjusted with 10% lithium hydroxide so as to have a pH value of 9, followed by being filtered through a membrane filter having an average pore diameter of 0.8 μm, to thereby obtain an ink composition.

| | |
|---|---|
| Carbon black pigment dispersion liquid of Preparation Example 1 (solid content) | 8.0% by mass |
| 1,3-butanediol | 19.7% by mass |
| trimethylglycine | 12.3% by mass |
| Surfactant expressed by the structural formula 1(PF-151N, manufactured by OMNOVA SOLUTIONS INC.) | 0.5% by mass |
| 2-ethyl-1,3-hexanediol | 2.0% by mass |
| Ion-exchanged water | 57.5% by mass |

Example 6

The materials of the following formula were mixed, and then adjusted with 10% lithium hydroxide so as to have a pH value of 9, followed by being filtered through a membrane filter having an average pore diameter of 0.8 μm, to thereby obtain an ink composition.

| | |
|---|---|
| Carbon black pigment-containing polymer particle dispersion liquid of Preparation Example 2 (solid content) | 10.0% by mass |
| 1,3-butanediol | 19.7% by mass |
| trimethylglycine | 12.3% by mass |
| Surfactant expressed by the structural formula 1(PF-151N, manufactured by OMNOVA SOLUTIONS INC.) | 0.5% by mass |
| 2-ethyl-1,3-hexanediol | 2.0% by mass |
| Ion-exchanged water | 55.5% by mass |

Example 7

The materials of the following formula were mixed, and then adjusted with 10% lithium hydroxide so as to have a pH value of 9, followed by being filtered through a membrane filter having an average pore diameter of 0.8 μm, to thereby obtain an ink composition.

| | |
|---|---|
| Carbon black pigment dispersion liquid of Preparation Example 1 (solid content) | 8.0% by mass |
| 3-methyl-1,3-butanediol | 17.8% by mass |
| trimethylglycine | 15.2% by mass |
| Surfactant expressed by the structural formula 1(PF-151N, manufactured by OMNOVA SOLUTIONS INC.) | 0.5% by mass |
| 2-ethyl-1,3-hexanediol | 2.0% by mass |
| Ion-exchanged water | 56.5% by mass |

Example 8

The materials of the following formula were mixed, and then adjusted with 10% lithium hydroxide so as to have a pH value of 9, followed by being filtered through a membrane filter having an average pore diameter of 0.8 μm, to thereby obtain an ink composition.

| | |
|---|---|
| Carbon black pigment-containing polymer particle dispersion liquid of Preparation Example 2 (solid content) | 10.0% by mass |
| 3-methyl-1,3-butanediol | 17.8% by mass |
| trimethylglycine | 15.2% by mass |
| Surfactant expressed by the structural formula 1(PF-151N, manufactured by OMNOVA SOLUTIONS INC.) | 0.5% by mass |
| 2-ethyl-1,3-hexanediol | 2.0% by mass |
| Ion-exchanged water | 54.5% by mass |

Comparative Example 1

The materials of the following formula were mixed, and then adjusted with 10% lithium hydroxide so as to have a pH value of 9, followed by being filtered through a membrane filter having an average pore diameter of 0.8 μm, to thereby obtain an ink composition.

| | |
|---|---|
| Carbon black pigment dispersion liquid of Preparation Example 1 (solid content) | 8.0% by mass |
| 1,3-butanediol | 19.7% by mass |
| glycerin | 12.3% by mass |
| Surfactant expressed by the structural formula 1(PF-151N, manufactured by OMNOVA SOLUTIONS INC.) | 0.5% by mass |
| 2-ethyl-1,3-hexanediol | 2.0% by mass |
| Ion-exchanged water | 57.5% by mass |

Comparative Example 2

The materials of the following formula were mixed, and then adjusted with 10% lithium hydroxide so as to have a pH value of 9, followed by being filtered through a membrane filter having an average pore diameter of 0.8 μm, to thereby obtain an ink composition.

| | |
|---|---|
| Carbon black pigment-containing polymer particle dispersion liquid of Preparation Example 2 (solid content) | 10.0% by mass |
| 1,3-butanediol | 19.7% by mass |
| glycerin | 12.3% by mass |
| Surfactant expressed by the structural formula 1(PF-151N, manufactured by OMNOVA SOLUTIONS INC.) | 0.5% by mass |
| 2-ethyl-1,3-hexanediol | 2.0% by mass |
| Ion-exchanged water | 57.5% by mass |

Comparative Example 3

The materials of the following formula were mixed, and then adjusted with 10% lithium hydroxide so as to have a pH value of 9, followed by being filtered through a membrane filter having an average pore diameter of 0.8 μm, to thereby obtain an ink composition.

| | |
|---|---|
| Carbon black pigment dispersion liquid of Preparation Example 3 (solid content) | 8.0% by mass |
| 1,6-hexanediol | 12.7% by mass |
| glycerin | 24.3% by mass |
| acetylene glycol surfactant (SURFYNOL 465, manufactured by Air Products Japan, Inc.) | 0.5% by mass |
| 2-ethyl-1,3-hexanediol | 2.0% by mass |
| Ion-exchanged water | 52.5% by mass |

Comparative Example 4

The materials of the following formula were mixed, and then adjusted with 10% lithium hydroxide so as to have a pH value of 9, followed by being filtered through a membrane filter having an average pore diameter of 0.8 µm, to thereby obtain an ink composition.

| | |
|---|---|
| Carbon black pigment dispersion liquid of Preparation Example 4 (solid content) | 8.0% by mass |
| 1,5-pentanediol | 15.8% by mass |
| glycerin | 29.2% by mass |
| acetylene glycol surfactant (SURFYNOL 465, manufactured by Air Products Japan, Inc.) | 0.5% by mass |
| 2-ethyl-1,3-hexanediol | 2.0% by mass |
| Ion-exchanged water | 44.5% by mass |

Comparative Example 5

An ink composition was obtained in the same manner as in Comparative Example 1, provided that 1,3-butane diol was replaced with trimethylglycine.

Each of the aforementioned inks of Examples and Comparative Examples were evaluated in terms of a change in the particle diameters related to the solvent retention, image density, jetting stability, and ink storage stability.

<Change in Particle Diameters Related to Solvent Retention>

Figure 2:
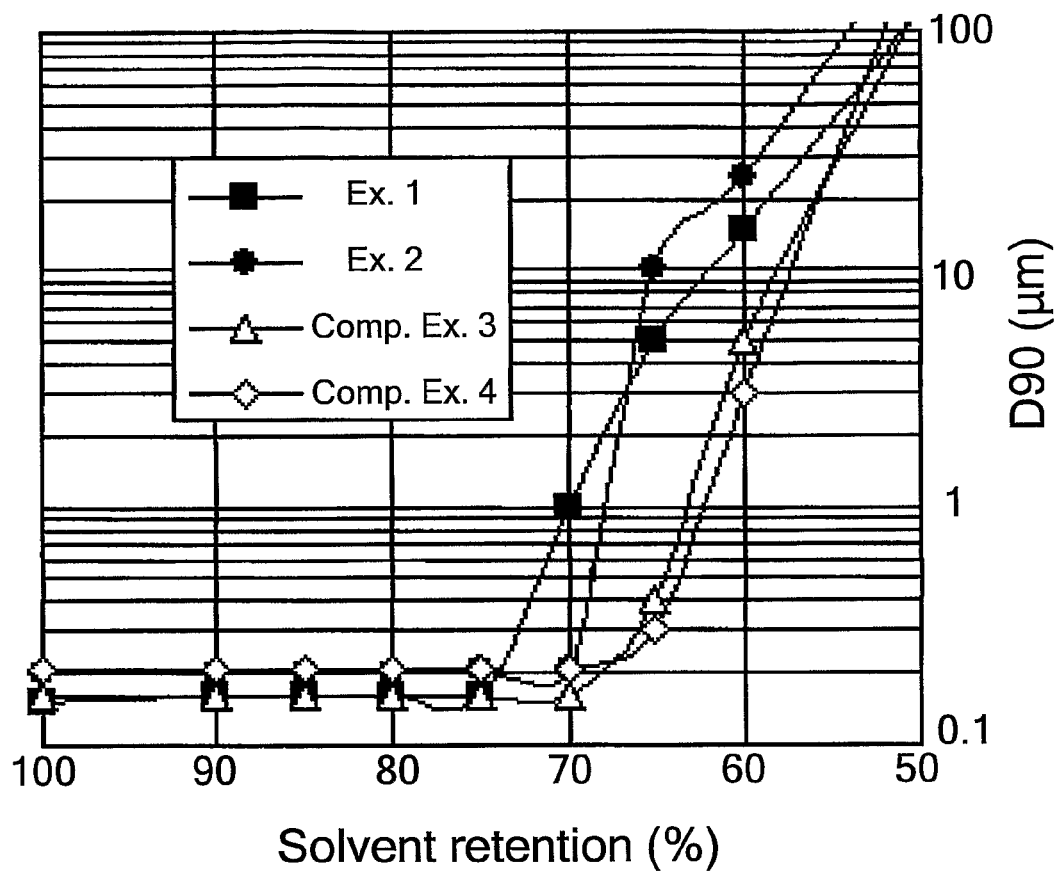
FIG. 2 is a diagram showing a relationship between the retention of the solvent and D90.

A certain amount of each of the inks of Examples 1 and 2, and Comparative Examples 3 and 4 was left to stand in the environment at the temperature of 50° C. and the relative humidity of 10%, and after a certain period of time, the change in the weight of the ink and calculative average particle diameter (D50, D90) of the pigment particles at that time were measured. The results are shown in FIGS. 1 and 2.

For the measurement of the calculative average particle diameter, MICROTRAC UPA was used.

Using each of the inks of Examples 1 to 8 and Comparative Examples 1, 2 and 5, printing was performed at the image resolution of 600 dpi on plane paper copier (PPC) paper 4024 manufactured by Xerox Corporation as a recording medium, by means of a prototype of a drop-on-demand printer having a nozzle resolution of 300 dpi, and 384 nozzles. The deposition of the ink was controlled by adjusting the maximum size of a droplet to be 18 pL, and the total amount of the secondary color to be 140%. A solid image and characters were printed, provided that the total amount of the ink was adjusted so as no to exceed 15 g/m² on the area of 300 dot×300 dot when the solid image was printed.

The image density at the time of the aforementioned printing and the jetting stability after the printing were evaluated in the following manners.

<Image Density>

The optical density of the obtained magenta solid image portion was measured by X-Rite938, and evaluated based on the following criteria. The results are shown in Table 1.

[Evaluation Criteria]
A: 1.6 or more
B: 1.3 or more, but less than 1.6
C: 1.0 or more, but less than 1.3
D: less than 1.0

<Jetting Stability>

After printing solid images and characters, the printer was left for one month at the temperature of 40° C., with the printer head capped. Thereafter, the jetting condition of the printer was judged and evaluated whether or not the jetting condition was recovered to the initial jetting condition based on the following number of the cleaning operations.

A: Recovered after one operation.
B: Recovered after two to three operations.
C: No recovery was observed even after four or more operations.

<Ink Storage Stability>

Each of the inks of Examples 1 to 8 and Comparative Examples 1, 2 and 5 were housed in a polystyrene container and the container was sealed. In this condition, the ink was stored at 70° C. for 30 days. After the storage, the particle diameters, surface tension, and viscosity were measured, and the rates of change from the initial properties were evaluated based on the following criteria.

A: less than 10% on all of the particle diameters, surface tension and viscosity.
B: 10% or more on at least one of the particle diameters, surface tension and viscosity.

TABLE 1

| | Image density | Jetting stability | Ink storage stability |
|---|---|---|---|
| Ex. 1 | A | A | A |
| Ex. 2 | A | A | A |
| Ex. 3 | A | A | A |
| Ex. 4 | A | A | A |
| Ex. 5 | A | A | A |
| Ex. 6 | A | A | A |
| Ex. 7 | A | A | A |
| Ex. 8 | A | A | A |
| Comp. Ex. 1 | A | A | B |
| Comp. Ex. 2 | A | A | B |
| Comp. Ex. 5 | D | B | B |

As seen from the results shown in Table 1, the inks of Examples 1-8 had excellent results on all of the image density, jetting stability, and ink storage stability, but the inks of Comparative Examples 1 and 2 in which C4-6 diol and glycerin were used, and the ink of Comparative Example 5, in which trimethylglycine and glycerin were used had the undesirable result on the storage stability.

The invention claimed is:

1. An inkjet ink, comprising:
pigment;
C4-6 diol; and
trimethylglycine.

2. The inkjet ink of claim 1, wherein the C4-6 diol is at least one selected from the group consisting of 1,6-hexane diol, 1,5-pentane diol, 1,3-butane diol, and 3-methyl-1,3-butane diol.

3. An ink cartridge, comprising:
a container; and
the inkjet ink of claim 2, which is housed in the container.

4. An image forming device, comprising:
the ink cartridge of claim 3.

5. An image forming method, comprising:
forming an image with an inkjet recording device with the inkjet ink of claim 2.

6. An image formed matter, comprising:
a recording medium; and
an image formed on the recording medium by an inkjet recording device with the inkjet ink of claim 2.

7. An ink cartridge, comprising:
a container; and
the inkjet ink of claim 1, which is housed in the container.

8. An image forming device, comprising:
the ink cartridge of claim 7.

9. An image forming method, comprising:
forming an image with an inkjet recording device with the inkjet ink of claim 1.

10. An image formed matter, comprising:
a recording medium; and
an image formed on the recording medium by an inkjet recording device with the inkjet ink of claim 1.

11. The inkjet ink of claim 1, wherein the C4-6 diol comprises 1,6-hexane diol.

12. The inkjet ink of claim 1, wherein the C4-6 diol comprises 1,5-pentane diol.

13. The inkjet ink of claim 1, wherein the C4-6 diol comprises 1,3-butane diol.

14. The inkjet ink of claim 1, wherein the C4-6 diol comprises 3-methyl-1,3-butane diol.

15. The inkjet ink of claim 1, wherein the C4-6 diol and the trimethylglycine have an equilibrium moisture content of 25% by mass or more at 20° C. and a relative humidity of 60% and wherein the cumulative average particle diameter D50 of the pigment particles is 20 nm to 150 nm.

16. The inkjet ink of claim 1, wherein the C4-6 diol and the trimethylglycine have an equilibrium moisture content of 30% by mass or more at 20° C. and a relative humidity of 60% and wherein the cumulative average particle diameter D50 of the pigment particles is 20 nm to 150 nm.

17. The inkjet ink of claim 1, wherein the C4-6 diol and the trimethylglycine have an equilibrium moisture content of 35% by mass or more at 20° C. and a relative humidity of 60% and wherein the cumulative average particle diameter D50 of the pigment particles is 50 nm to 130 nm.

18. The inkjet ink of claim 1, wherein a proportion of the C4-6 diol and the trimethylglycine in the ink is 10% by mass to 50% by mass, and the amount of the pigment in the inkjet ink is 0.5% by mass to 15% by mass.

19. The inkjet ink of claim 1, wherein a proportion of the C4-6 diol and the trimethylglycine in the ink is 25% by mass to 50% by mass, and the amount of the pigment in the inkjet ink is 5% by mass to 12% by mass.

20. The inkjet ink of claim 1, wherein a proportion of the C4-6 diol and the trimethylglycine in the ink is 10% by mass to 35% by mass, and the amount of the pigment in the inkjet ink is 5% by mass to 12% by mass.

* * * * *